United States Patent
Tagi et al.

(10) Patent No.: US 10,122,074 B2
(45) Date of Patent: Nov. 6, 2018

(54) ANTENNA DEVICE USING EBG STRUCTURE, WIRELESS COMMUNICATION DEVICE, AND RADAR DEVICE

(71) Applicant: Panasonic Intellectual Property Management Co., Ltd., Osaka (JP)

(72) Inventors: Hiroyoshi Tagi, Osaka (JP); Hideki Iwaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 466 days.

(21) Appl. No.: 14/883,368

(22) Filed: Oct. 14, 2015

(65) Prior Publication Data

US 2016/0141748 A1    May 19, 2016

(30) Foreign Application Priority Data

Nov. 19, 2014  (JP) ................. 2014-234819

(51) Int. Cl.
*H01Q 1/38* (2006.01)
*G01S 7/03* (2006.01)
(Continued)

(52) U.S. Cl.
CPC .............. *H01Q 1/38* (2013.01); *G01S 7/032* (2013.01); *H01Q 1/521* (2013.01); *H01Q 15/006* (2013.01)

(58) Field of Classification Search
CPC ........ H01Q 1/38; H01Q 1/521; H01Q 15/006; H01Q 1/2283; H01Q 9/0414; H01Q 1/243;
(Continued)

(56) References Cited

U.S. PATENT DOCUMENTS 5,801,660 A * 9/1998 Ohtsuka ............... H01Q 9/0414
343/700 MS
5,903,239 A * 5/1999 Takahashi ............. H01Q 1/22
333/247
(Continued)

FOREIGN PATENT DOCUMENTS

EP   1624527 A4 *  2/2007 ........... H01Q 1/1271
JP   2006-060537     3/2006
(Continued)

*Primary Examiner* — Timothy A Brainard
*Assistant Examiner* — Nuzhat Pervin
(74) *Attorney, Agent, or Firm* — McDermott Will and Emery LLP

(57) ABSTRACT

An antenna device comprises a dielectric substrate that has first and second surfaces; first and second antenna elements that are arranged on the first surface of the dielectric substrate; a ground conductor that is arranged on the second surface of the dielectric substrate; and an electromagnetic band gap structure that is arranged between the first and second antenna elements on the dielectric substrate. The electromagnetic band gap structure comprises: a plurality of patch conductors that are arranged on the first surface of the dielectric substrate and are electromagnetically coupled with the ground conductor; and at least one opening that is arranged in the ground conductor to expose the dielectric substrate, and causes the electromagnetic coupling between the plurality of patch conductors and the ground conductor to change.

12 Claims, 12 Drawing Sheets

(51) Int. Cl.
*H01Q 1/52* (2006.01)
*H01Q 15/00* (2006.01)

(58) Field of Classification Search
CPC .. H01Q 1/22; H01Q 1/48; H01Q 3/44; H01Q 1/241; G01S 7/032; H05K 1/0236; H01P 5/18; H01P 1/2005; H01R 23/70; H01L 23/36
USPC .......................................................... 342/175
See application file for complete search history.

(56) References Cited

U.S. PATENT DOCUMENTS

| | | | | |
|---|---|---|---|---|
| 6,545,640 | B1* | 4/2003 | Herve | H01Q 1/243 343/700 MS |
| 7,227,759 | B2* | 6/2007 | Grundy | H01R 23/70 361/785 |
| 7,612,632 | B2* | 11/2009 | Tanaka | H01P 1/2005 333/26 |
| 7,855,689 | B2* | 12/2010 | Fukui | H01Q 1/241 343/731 |
| 8,204,545 | B2* | 6/2012 | Shimasaki | H01P 5/18 343/702 |
| 9,258,884 | B2* | 2/2016 | Saito | H05K 1/0236 |
| 9,629,282 | B2* | 4/2017 | Kasahara | H05K 1/0236 |
| 2007/0152885 | A1* | 7/2007 | Sorvala | H01Q 1/2283 343/700 MS |
| 2007/0171131 | A1* | 7/2007 | Sorvala | H01Q 1/243 343/700 MS |
| 2010/0176998 | A1* | 7/2010 | Sorvala | H01Q 1/2283 343/702 |
| 2011/0122041 | A1* | 5/2011 | Morishita | H01Q 1/48 343/846 |
| 2011/0212697 | A1* | 9/2011 | Aoki | H01Q 3/44 455/131 |
| 2012/0068889 | A1* | 3/2012 | Sorvala | H01Q 1/243 343/700 MS |

FOREIGN PATENT DOCUMENTS

| | | | | |
|---|---|---|---|---|
| JP | 2006060537 A | * | 3/2006 | ............ H04B 7/10 |
| JP | 2009-203147 | | 9/2009 | |
| JP | 2009203147 A | * | 9/2009 | ............ C03B 19/02 |
| JP | 2011-055306 | | 3/2011 | |
| JP | 2013150298 A | * | 8/2013 | ............ H01P 5/107 |
| KR | 20060009848 A | * | 2/2006 | ........... H01Q 1/1271 |

* cited by examiner

ANTENNA DEVICE USING EBG STRUCTURE, WIRELESS COMMUNICATION DEVICE, AND RADAR DEVICE

BACKGROUND

1. Technical Field

The present disclosure relates to an antenna device provided with a plurality of antenna elements and an electromagnetic band gap (EBG) structure. The present disclosure also relates to a wireless communication device and a radar device provided with such an antenna device.

2. Description of the Related Art

The use of an EBG structure to ensure isolation between antenna elements in an antenna device that comprises a plurality of antenna elements and operates in an extremely high frequency (EHF) band is conventionally known (see Japanese Unexamined Patent Application Publication Nos. 2009-203147 and 2006-060537). An EBG structure exhibits high impedance at a prescribed frequency (antiresonance frequency). Consequently, an antenna device provided with an EBG structure is able to increase the isolation between antenna elements in this frequency.

SUMMARY

An aspect of the present disclosure provides an antenna device that is able to adjust the antiresonance frequency of an EBG structure.

In one general aspect, the techniques disclosed here feature an antenna device comprising: a dielectric substrate that has first and second surfaces; first and second antenna elements that are arranged on the first surface of the dielectric substrate; a ground conductor that is arranged on the second surface of the dielectric substrate; and an electromagnetic band gap (EBG) structure that is arranged between the first and second antenna elements on the dielectric substrate. The EBG structure comprises: a plurality of patch conductors that are arranged on the first surface of the dielectric substrate and are electromagnetically coupled with the ground conductor; and at least one opening that is arranged in the ground conductor to expose the dielectric substrate, and causes the electromagnetic coupling between the plurality of patch conductors and the ground conductor to change.

According to an aspect of the present disclosure, it is possible to provide an antenna device that is able to adjust the antiresonance frequency of an EBG structure. It should be noted that general or specific aspects of the present disclosure may be implemented as an antenna device, a wireless communication device, a radar device, an apparatus, a system or any combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Findings Forming the Basis for the Present Disclosure

A mushroom-type EBG structure, which is an example of an EBG structure, includes a mushroom-type conductor that includes a plurality of patch conductors formed on a dielectric substrate, a plurality of via conductors, and a ground conductor. The performance of a mushroom-type EBG structure is dependent upon the diameters of the via conductors, the minimum dimensions of the patch conductors, and the like; however, there are process limitations to these dimensions, and it is not always possible to realize dimensions that bring about a prescribed antiresonance frequency. Consequently, there are instances where it is difficult to ensure isolation in a desired frequency band even when an EBG structure is used.

Meanwhile, when additional components and so forth are provided in order to change the antiresonance frequency of an EBG structure, the dimensions of the antenna device increase and cost also consequently increases.

Therefore, the present inventors carried out assiduous research in order to provide an antenna device equipped with an EBG structure, with which there are few process limitations, excessive components for adjusting frequency are not required, there is no increase in the size of the antenna device, and it is possible to adjust the antiresonance frequency of the EBG structure.

The present inventors additionally carried out assiduous research in order to provide a wireless communication device and a radar device provided with such an antenna device.

According to the antenna device of the present disclosure, it is possible to provide an antenna device equipped with an EBG structure, with which there are few process limitations, excessive components for adjusting frequency are not required, there is no increase in the size of the antenna device, and it is possible to adjust the antiresonance frequency of the EBG structure.

Hereinafter, an antenna device according to an embodiment will be described with reference to the drawings. In the following description, same symbols are appended to same or similar constituent elements.

First Embodiment

Figure 1:
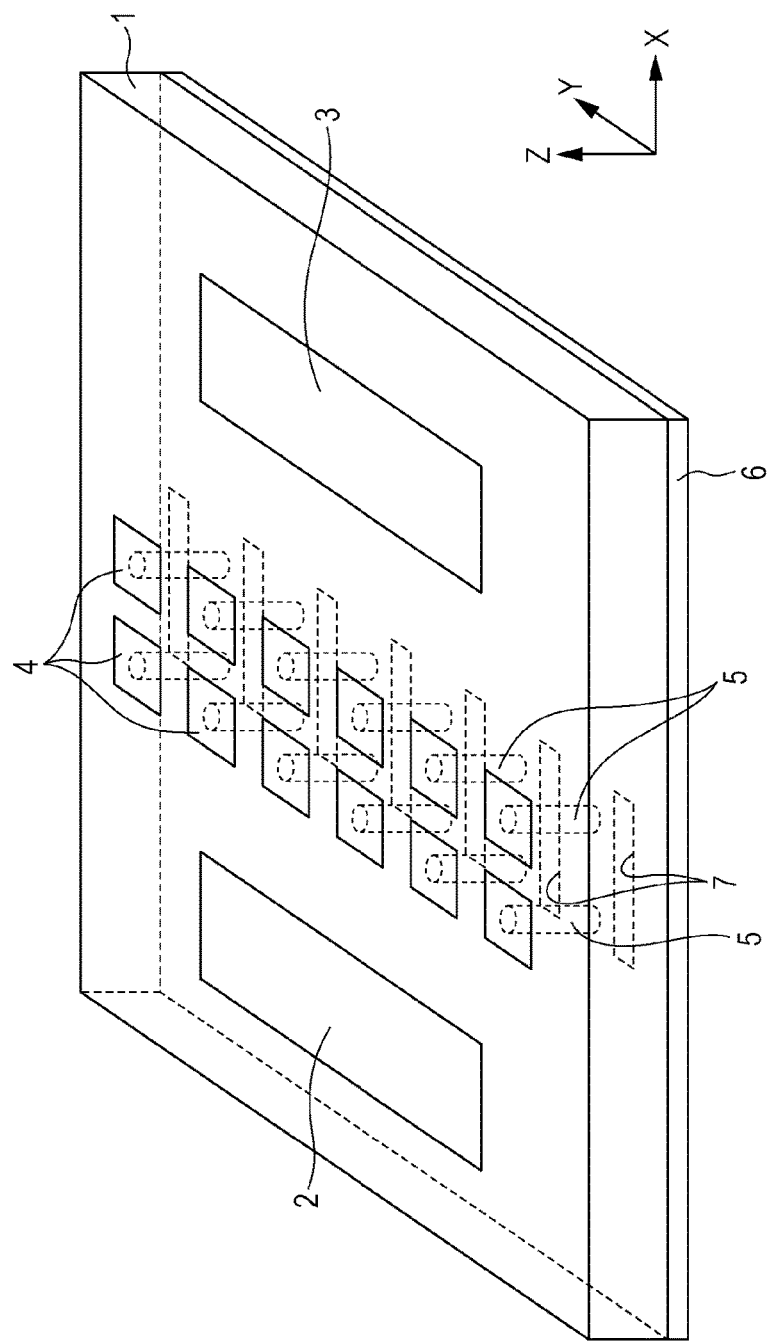
FIG. 1 is a perspective view illustrating the configuration of an antenna device according to a first embodiment.
Figure 2:
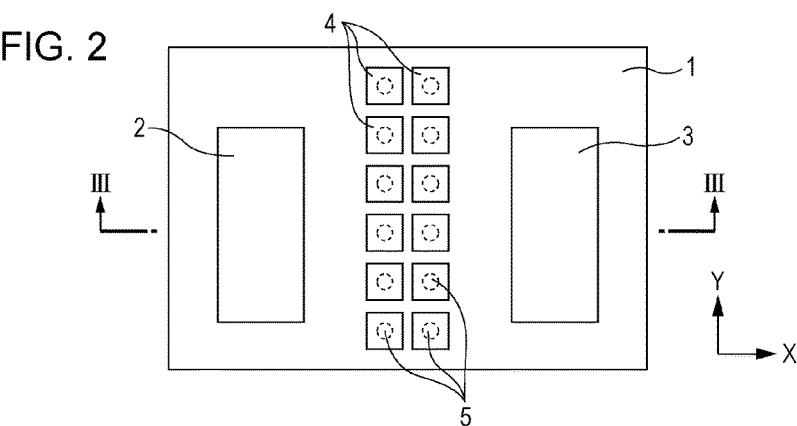
FIG. 2 is a top view illustrating the configuration of the antenna device of FIG. 1.
Figure 3:
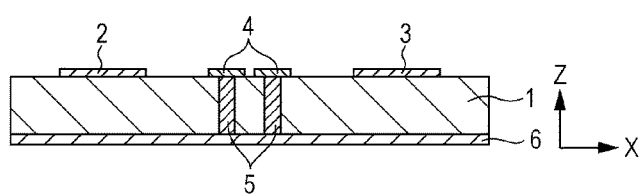
FIG. 3 is a cross-sectional view illustrating the configuration of the antenna device at line III-III of FIG. 2.
Figure 4:
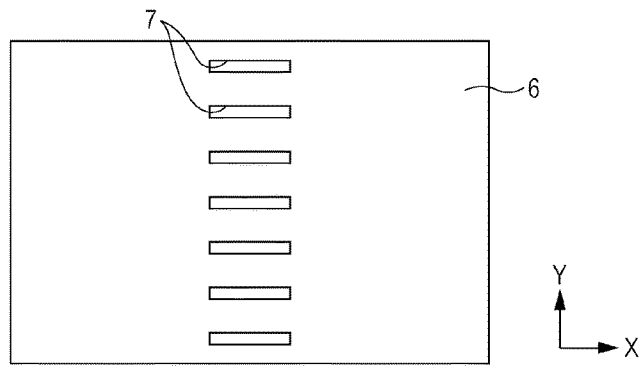
FIG. 4 is a top view illustrating the pattern of a ground conductor of FIG. 1.

FIG. 1 is a perspective view illustrating the configuration of an antenna device according to a first embodiment. FIG. 2 is a top view illustrating the configuration of the antenna device of FIG. 1. FIG. 3 is a cross-sectional view illustrating the configuration of the antenna device at line III-III of FIG. 2. FIG. 4 is a top view illustrating the pattern of a ground conductor 6 of FIG. 1.

The antenna device of FIG. 1 comprises: a dielectric substrate 1 that has a first surface (upper surface in FIG. 1) and a second surface (lower surface in FIG. 1); antenna elements 2 and 3 that are formed on the first surface of the dielectric substrate 1; the ground conductor 6, which is formed on the second surface of the dielectric substrate 1; and an EBG structure that is formed between the antenna elements 2 and 3 on the dielectric substrate 1. The EBG structure comprises: a plurality of patch conductors 4 that are formed on the first surface of the dielectric substrate 1 and are electromagnetically coupled with the ground conductor 6; and an electromagnetic coupling adjustment section that is formed with the ground conductor 6 being partially removed such that the electromagnetic coupling between the plurality of patch conductors 4 and the ground conductor 6 is made to change. The electromagnetic coupling adjustment section, for example, is constituted by openings that are arranged in the ground conductor 6 and cause the dielectric substrate 1 to be exposed.

In the example of FIG. 1, each patch conductor 4 has a square shape. However, each patch conductor 4 is not restricted to a square and may have any shape such as a triangle, a hexagon, a rectangle, or the like.

The plurality of patch conductors 4 are formed in a plurality of columns that extend so as to intersect a line that joins the antenna elements 2 and 3. In the example of FIG. 1, the plurality of patch conductors 4 are arranged in two columns along the Y axis. The EBG structure is further provided with a plurality of via conductors 5 that each pass through the dielectric substrate 1. Thereby, the plurality of patch conductors 4 and the ground conductor 6 are connected through the plurality of via conductors 5. Consequently, the EBG structure includes a plurality of mushroom-type conductors.

The electromagnetic coupling adjustment section comprises, in at least one column from among the plurality of columns of the patch conductors 4, at least one slit 7 that is formed in the ground conductor 6 so as to oppose a portion between at least one pair of patch conductors 4 that are mutually adjacent in the column. In the example of FIG. 1, each slit 7 is formed in the ground conductor 6 so as to oppose a portion between patch conductors 4 that are mutually adjacent in the Y direction. Each patch conductor 4 is capacitively coupled with the ground conductor 6, and therefore each slit 7 is arranged such that the magnitude of this capacitance is not caused to decrease. Consequently, the at least one slit 7 is formed in the ground conductor 6 so as to not overlap with each patch conductor 4 when vertically projected on the first surface.

In the example of FIG. 1, each slit 7 has a longitudinal (X direction of FIG. 1) length that corresponds to the patch conductors 4 of two columns. However, the longitudinal length of each slit 7 may be longer or may be shorter than the length illustrated in FIG. 1. For example, each slit 7 may be formed for each column rather than being linked across a length that corresponds to the patch conductors 4 of two columns as illustrated in FIG. 1.

As illustrated in FIG. 1, the EBG structure may be further provided with a slit 7 that is formed close to the +Y side of the patch conductor 4 at the +Y side end, and/or a slit 7 that is formed close to the −Y side of the patch conductor 4 at the −Y side end. Furthermore, in the EBG structure, some of the slits in FIG. 1 may not be provided in accordance with the desired antiresonance frequency.

As a result of comprising, in each column of the patch conductors 4 of two columns, the slits 7 that are formed in the ground conductor 6 so as to oppose the portions between the patch conductors 4 that are mutually adjacent in the column in question, the antenna device of FIG. 1 is able to cause the electromagnetic coupling between each patch conductor 4 and the ground conductor 6 to change and to cause the antiresonance frequency of the EBG structure to change to the low-frequency side.

The antenna device of FIG. 1 operates in an EHF band, for example. However, the antenna device of FIG. 1 is not restricted to an EHF band and may operate in any frequency in which it is possible to use the antiresonance frequency of the EBG structure.

Next, the operation of the antenna device of FIG. 1 will be described with reference to FIGS. 5 to 10.

Figure 5:
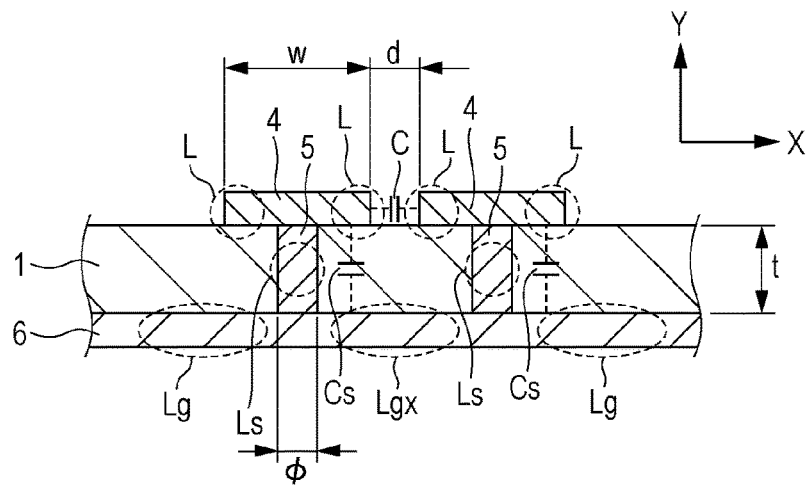
FIG. 5 is an enlarged view illustrating the detailed configuration of an EBG structure of the antenna device of FIG. 3.
Figure 6:
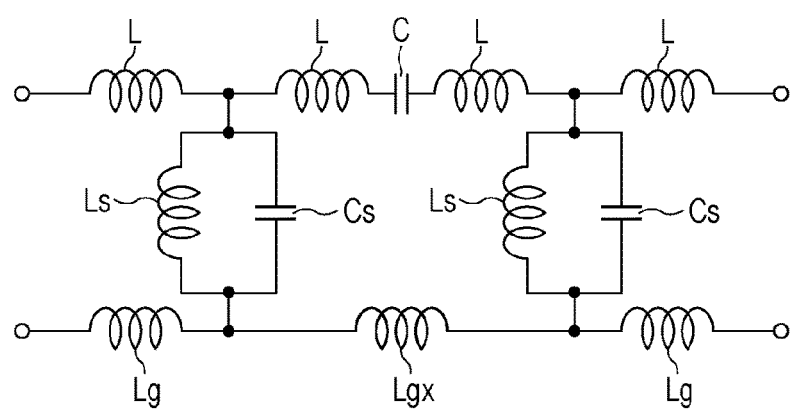
FIG. 6 is an equivalent circuit diagram of the EBG structure of FIG. 5.

FIG. 5 is an enlarged view illustrating the detailed configuration of the EBG structure of the antenna device of FIG. 3. FIG. 6 is an equivalent circuit diagram of the EBG structure of FIG. 5. In FIG. 5, "w" indicates the length of the sides of the patch conductors 4, "d" indicates the distance between mutually adjacent patch conductors 4, "φ" indicates the diameter of the via conductors 5, and "t" indicates the distance between the patch conductors 4 and the ground conductor 6 (or the length of the via conductors 5). In addition, in FIGS. 5 and 6, "L" indicates the inductance of the patch conductors 4, "Ls" indicates the inductance of the via conductors 5, "Lg" indicates the inductance of the ground conductor 6 in a portion that is not opposing the patch conductors 4 (i.e. outside the EBG structure), and "Lgx" indicates the inductance of the ground conductor 6 in a portion that is opposing the patch conductors 4 (i.e. inside the EBG structure). In addition, "C" indicates the capacitance between the mutually adjacent patch conductors 4, and "Cs" indicates the capacitance between the patch conductors 4 and the ground conductor 6.

The antiresonance frequency of the EBG structure is determined by the capacitance and inductance of each portion that makes up the EBG structure. The inductance L of the patch conductors 4 is dependent upon the dimensions (for example, the length w of the sides) of the patch conductors 4. The capacitance C between the patch conductors 4 is dependent upon the distance d between the patch conductors 4. The capacitance Cs between the patch conductors 4 and the ground conductor 6 is dependent upon the area of the patch conductors 4 and the distance t between the patch conductors 4 and the ground conductor 6. The inductance Ls of the via conductors 5 is dependent upon the diameter φ and the length of the via conductors. The diameter φ and the length of the via conductors are subject to process limitations and are therefore substantially fixed values. Consequently, when the process limitations are taken into account, the parameters that are able to be altered when designing the antenna from among the aforementioned w, d, φ, and t are only the length w of the sides of the patch conductors 4 and the distance d between the patch conductors 4.

The following parameters were set and a simulation was carried out. The relative permittivity of the dielectric substrate 1 was $\varepsilon_r=3.0$ and the dielectric loss tangent was tan δ=0.0058. The antenna elements 2 and 3 were 0.91 mm×0.91 mm square patch antennas. The antenna elements 2 and 3 were arranged having a 13.2-mm distance (distance between centers) in the X direction. The EBG structure was arranged between the antenna elements 2 and 3. In the EBG structure, two patch conductors 4 were arranged in the X direction and 13 patch conductors 4 were arranged in the Y direction. The diameter of the via conductors 5 was 0.025 mm (i.e. φ=0.25 mm) and the length of the via conductors 5 was 0.254 mm (i.e. t=0.254 mm).

The effect of the length w of the sides of the patch conductors and the distance d between the patch conductors 4 in antenna devices according to comparative examples will be described with reference to FIGS. 7 to 9. The first comparative example is an antenna device that does not have the EBG structure (i.e. the patch conductors 4, the via conductors 5, and the slits 7) of FIG. 1. The second comparative example is an antenna device that has the patch conductors 4 and the via conductors 5, but does not have the slits 7 from among the EBG structure of FIG. 1.

Figure 7:
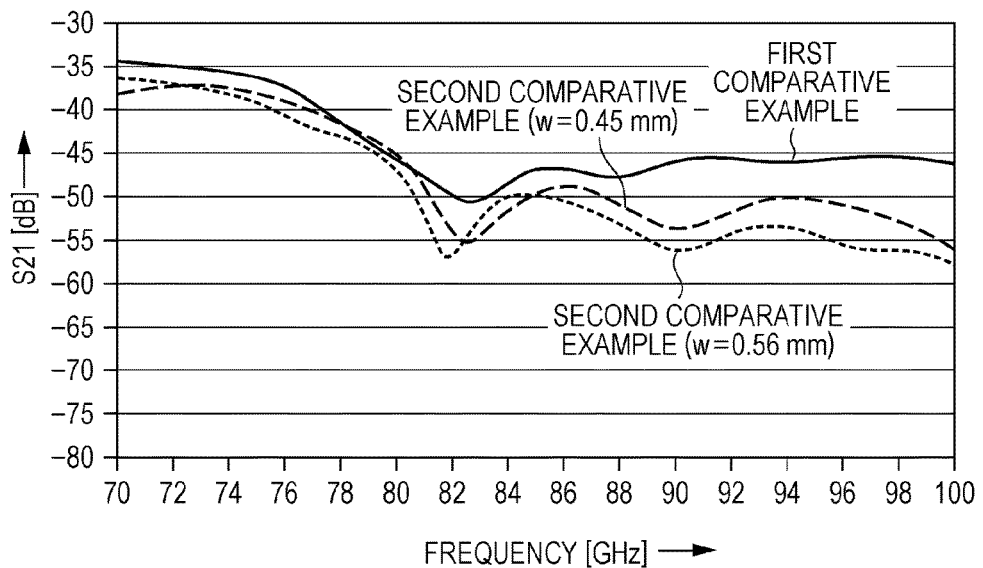
FIG. 7 is a graph of frequency characteristics indicating the effect of the length of the sides of patch conductors in antenna devices according to comparative examples.
Figure 8:
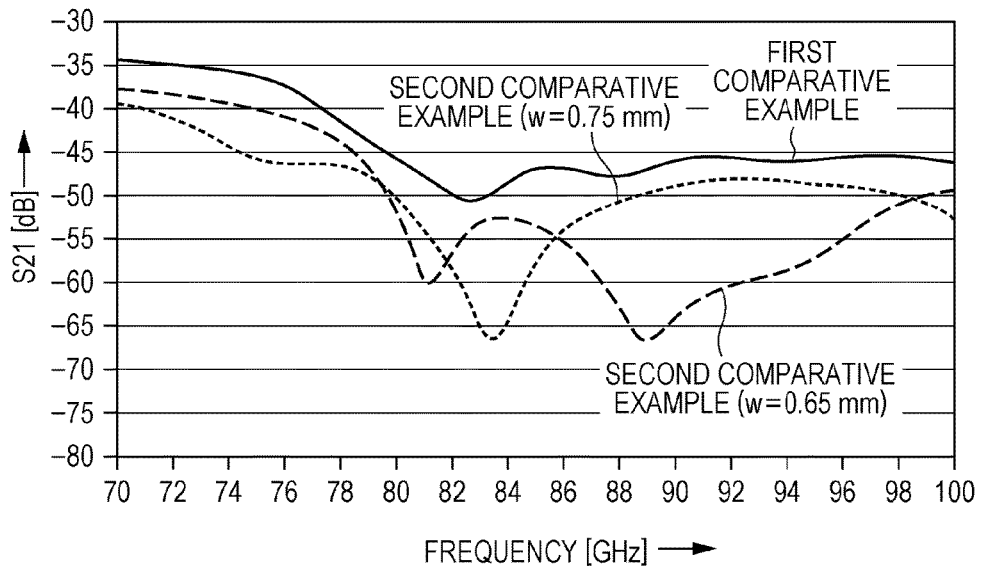
FIG. 8 is a graph of frequency characteristics indicating the effect of the length of the sides of patch conductors in antenna devices according to comparative examples.

FIGS. 7 and 8 are graphs of frequency characteristics indicating the effect of the length w of the sides of the patch conductors 4 in the antenna devices according to the comparative examples. In FIGS. 7 and 8, in the antenna device according to the second comparative example, the length w of the sides of the patch conductors 4 were changed while the distance between the patch conductors 4 was fixed at d=0.08 mm. The inductances L and Lgx increases in accordance with an increase in the dimensions of the patch conductors 4, and the antiresonance frequency (in the vicinity of 82 GHz) thereby shifts to the low-frequency side as illustrated in FIG. 7. When the dimensions of the patch conductors 4 are increased, the inductance L thereof increases to a certain dimension but starts to decrease when that dimension is exceeded, and the antiresonance frequency (in the vicinity of 82 GHz) thereby shifts to the high-frequency side as illustrated in FIG. 8. According to FIGS. 7 and 8, it is apparent that there is a limit to adjusting the antiresonance frequency of the EBG structure by changing the length w of the sides of the patch conductors 4.

Figure 9:
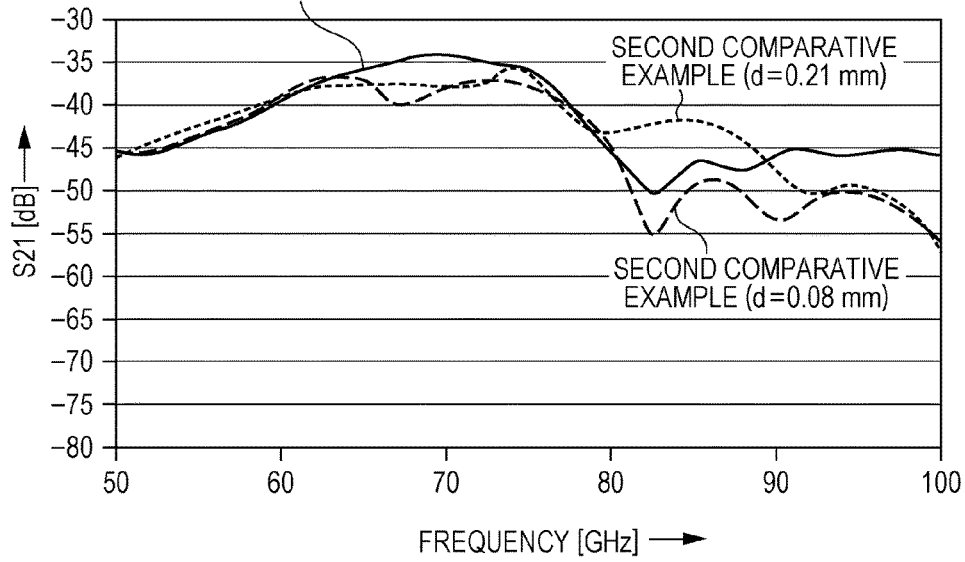
FIG. 9 is a graph of frequency characteristics indicating the effect of the distance between mutually adjacent patch conductors in antenna devices according to comparative examples.

FIG. 9 is a graph of frequency characteristics indicating the effect of the distance d between the mutually adjacent patch conductors 4 in the antenna devices according to the comparative examples. In FIG. 9, in the antenna device according to the second comparative example, the distance d between the patch conductors 4 was changed while the length of the sides of the patch conductors 4 was fixed at w=0.65 mm. When the distance between the patch conductors 4 is d=0.21 mm, a magnetic wall (i.e. perfect magnetic conductor) is not formed by the EBG structure and, on the whole, the performance of the EBG structure deteriorates (i.e. the antiresonance frequency is no longer generated). According to FIG. 9, it is apparent that there is a limit to adjusting the antiresonance frequency of the EBG structure by changing the distance d between the patch conductors 4.

It is feasible for the EBG structure to be formed of multiple stages in order to change the antiresonance frequency of the EBG structure. A multistage EBG structure comprises a plurality of substrates, and a plurality of via conductors are arranged in such a way as to pass through these substrates, for example. In this case, in each substrate, it is not possible to provide other components and wiring in portions in which the via conductors are provided, and therefore the dimensions of the antenna device increase and cost also consequently increases. Therefore, using a multistage EBG structure results in new design limitations.

Figure 10:
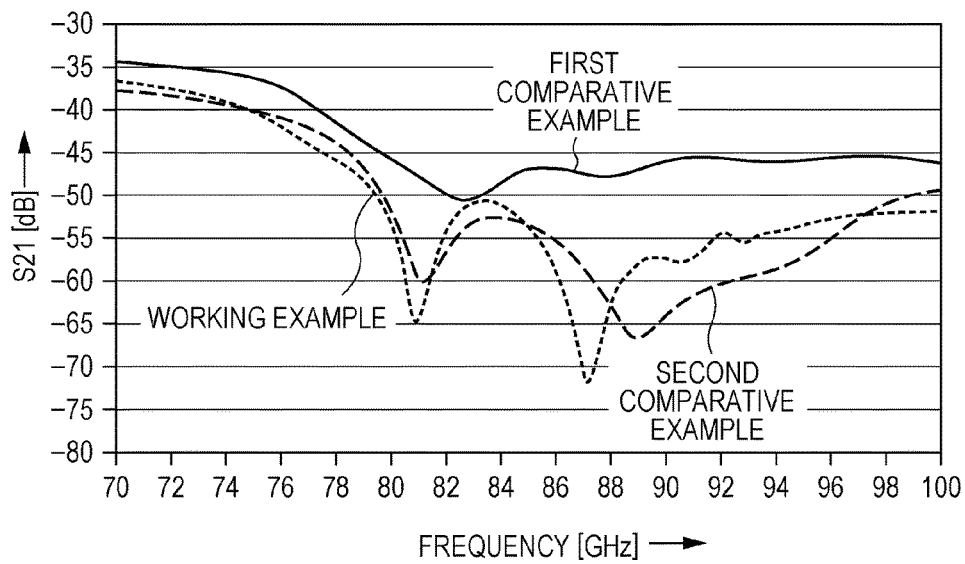
FIG. 10 is a graph of frequency characteristics of antenna devices according to a working example and comparative examples.

FIG. 10 is a graph of frequency characteristics of antenna devices according to a working example and the comparative examples. In FIG. 10, in the antenna devices according to the working example and the second comparative example, the length of the sides of the patch conductors 4 were fixed at w=0.65 mm and the distance between the patch conductors 4 was fixed at d=0.08 mm. In the antenna device according to the working example, the dimensions of each slit 7 were 13.8 mm in the X direction and 0.08 mm in the Y direction. In the antenna device according to the working example, by providing the slits 7 in the EBG structure, it is possible to increase the inductances Lg and Lgx of the ground conductor 6, and, as illustrated in FIG. 10, the antiresonance frequency (in the vicinity of 81 GHz and 88 GHz) thereby shifts to the low-frequency side compared with the antenna device according to the second comparative example.

According to the antenna device of FIG. 1, by providing the slits 7 in the EBG structure, the electromagnetic coupling between each patch conductor 4 and the ground conductor 6 is made to change for the antiresonance frequency of the EBG structure to be able to be shifted to the low-frequency side, and the isolation between the antenna elements 2 and 3 is able to be increased at this frequency.

Figure 11:
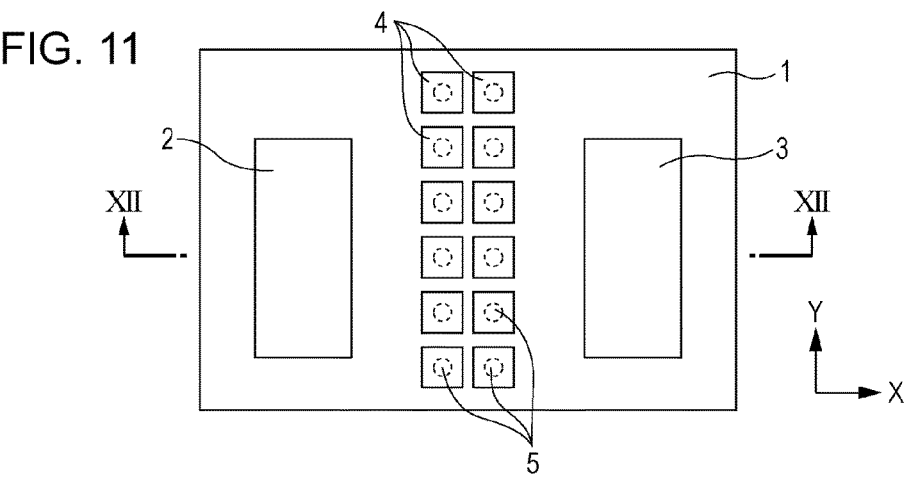
FIG. 11 is a top view illustrating the configuration of an antenna device according to a first modified example of the first embodiment.
Figure 12:
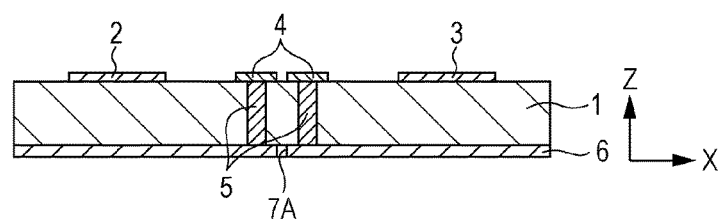
FIG. 12 is a cross-sectional view illustrating the configuration of the antenna device at line XII-XII of FIG. 11.
Figure 13:
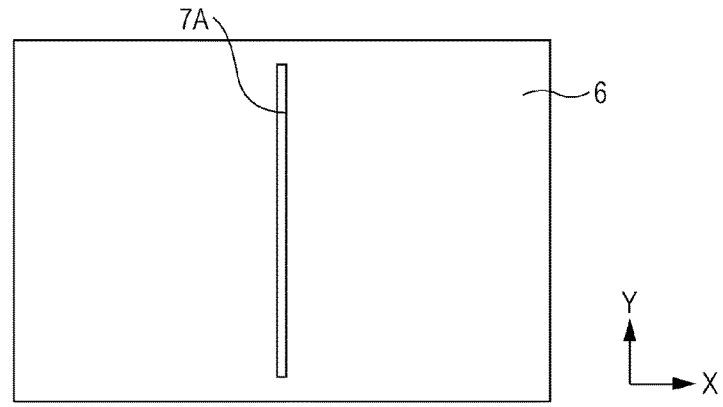
FIG. 13 is a top view illustrating the pattern of a ground conductor of FIG. 12.

FIG. 11 is a top view illustrating the configuration of an antenna device according to a first modified example of the first embodiment. FIG. 12 is a cross-sectional view illustrating the configuration of the antenna device at line XII-XII of FIG. 11. FIG. 13 is a top view illustrating the pattern of the ground conductor 6 of FIG. 12.

In the antenna device of FIGS. 11 to 13, instead of the plurality of slits 7 of FIG. 1, the electromagnetic coupling adjustment section comprises at least one slit 7A formed in the ground conductor 6 so as to oppose a portion between at least one pair of patch conductors 4 that are mutually adjacent between at least one pair of columns that are mutually adjacent from among the plurality of columns of the patch conductors 4. In the example of FIGS. 11 to 13, the slit 7A is formed in the ground conductor 6 so as to oppose a portion between the patch conductors 4 that are mutually adjacent in the X direction. Each patch conductor 4 is capacitively coupled with the ground conductor 6, and therefore the slit 7A is arranged such that the magnitude of this capacitance is not caused to decrease. Consequently, the at least one slit 7A is formed in the ground conductor 6 so as to not overlap with each patch conductor 4 when vertically projected on the first surface.

In the example of FIGS. 11 to 13, the slit 7A has a longitudinal (Y direction of FIG. 1) length that corresponds to a column of the patch conductors 4. However, the longitudinal length of the slit 7A may be longer or may be shorter than the length illustrated in FIG. 13. For example, rather than comprising the one slit 7A that is linked across a length that corresponds to a column of the patch conductors 4 as illustrated in FIG. 13, the EBG structure may be provided with one or more slits that are shorter.

According to the antenna device of FIGS. 11 to 13, by providing the slit 7A in the EBG structure, the electromagnetic coupling between each patch conductor 4 and the ground conductor 6 is made to change for the antiresonance frequency of the EBG structure to be able to be shifted to the high-frequency side, and the isolation between the antenna elements 2 and 3 is able to be increased at this frequency.

Figure 14:
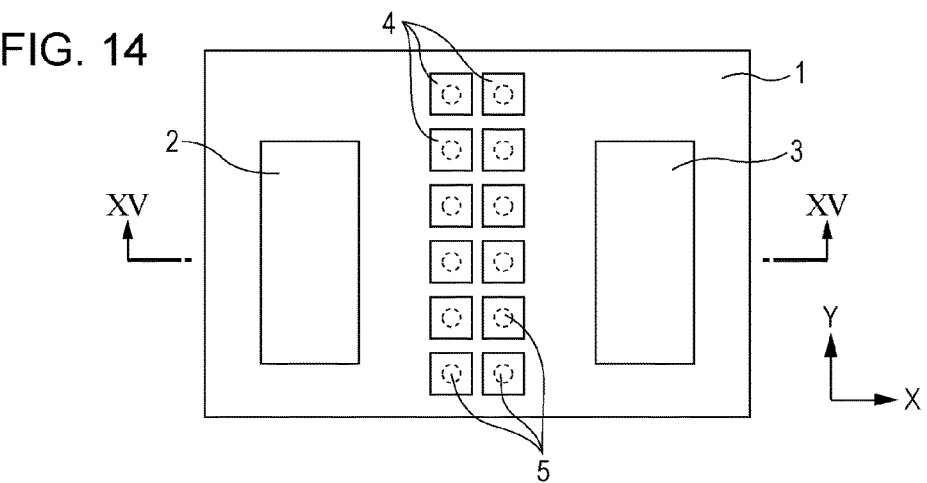
FIG. 14 is a top view illustrating the configuration of an antenna device according to a second modified example of the first embodiment.
Figure 15:
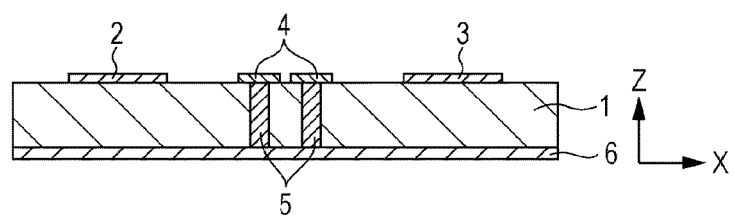
FIG. 15 is a cross-sectional view illustrating the configuration of the antenna device at line XV-XV of FIG. 14.
Figure 16:
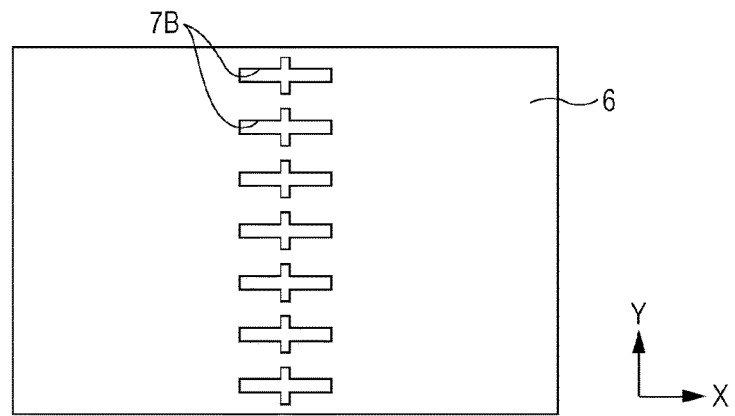
FIG. 16 is a top view illustrating the pattern of a ground conductor of FIG. 15.

FIG. 14 is a top view illustrating the configuration of an antenna device according to a second modified example of the first embodiment. FIG. 15 is a cross-sectional view illustrating the configuration of the antenna device at line XV-XV of FIG. 14. FIG. 16 is a top view illustrating the pattern of the ground conductor 6 of FIG. 15.

In the antenna device of FIGS. 14 to 16, the electromagnetic coupling adjustment section comprises a plurality of cross-shaped slits 7B instead of the plurality of slits 7 of FIG. 1. Each slit 7B, comprises: in at least one column from among the plurality of columns of the patch conductors 4, at least one slit portion (i.e. the portion that extends in the X direction of FIG. 16) that is formed in the ground conductor 6 so as to oppose a portion between at least one pair of the patch conductors 4 that are mutually adjacent in the column; and at least one slit portion (i.e. the portion that extends in the Y direction of FIG. 16) that is formed in the ground conductor 6 so as to oppose a portion between at least one pair of the patch conductors 4 that are mutually adjacent between at least one pair of columns that are mutually adjacent from among the plurality of columns of the patch conductors 4. Each patch conductor 4 is capacitively coupled with the ground conductor 6, and therefore the slits 7B are arranged such that the magnitude of this capacitance is not caused to decrease. Consequently, the plurality of slits 7B are formed in the ground conductor 6 so as to not overlap with each patch conductor 4 when vertically projected on the first surface.

According to the antenna device of FIGS. 14 to 16, by providing the slits 7B in the EBG structure, the electromagnetic coupling between each patch conductor 4 and the ground conductor 6 is made to change for the antiresonance frequency of the EBG structure to be able to be shifted to the low-frequency side, and the isolation between the antenna elements 2 and 3 is able to be increased at this frequency.

Second Embodiment

Figure 17:
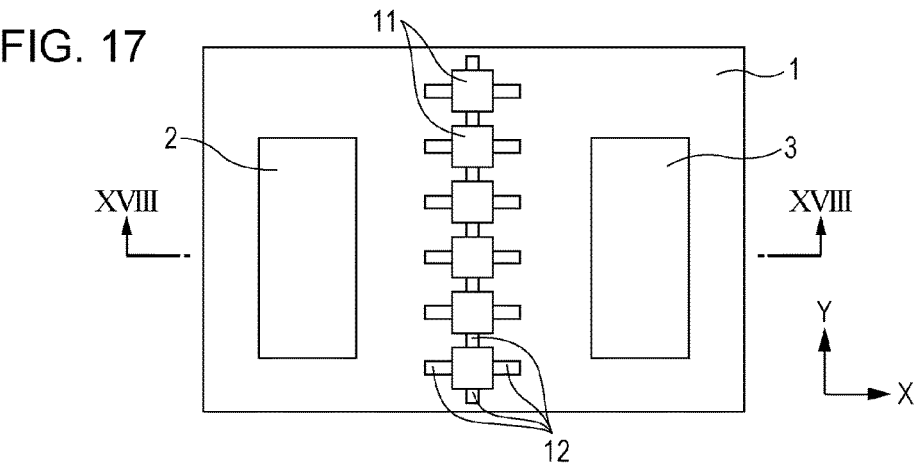
FIG. 17 is a top view illustrating the configuration of an antenna device according to a second embodiment.
Figure 18:
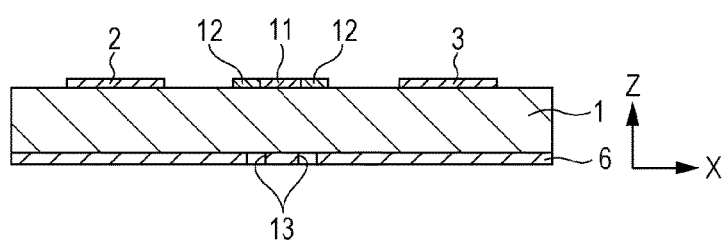
FIG. 18 is a cross-sectional view illustrating the configuration of the antenna device at line XVIII-XVIII of FIG. 17.
Figure 19:
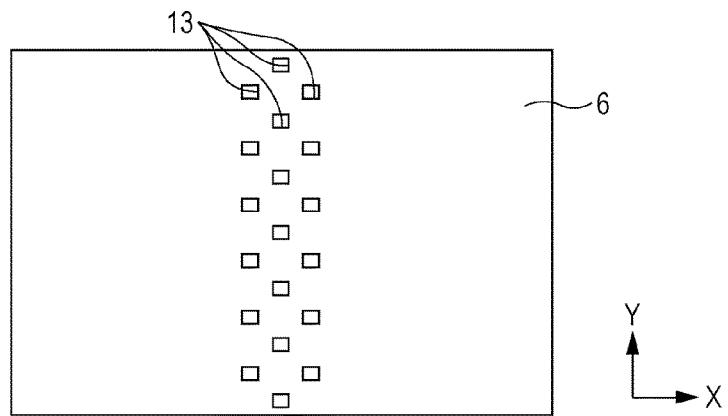
FIG. 19 is a top view illustrating the pattern of a ground conductor of FIG. 18.

FIG. 17 is a top view illustrating the configuration of an antenna device according to a second embodiment. FIG. 18 is a cross-sectional view illustrating the configuration of the antenna device at line XVIII-XVIII of FIG. 17. FIG. 19 is a top view illustrating the pattern of the ground conductor 6 of FIG. 18.

In the antenna device of FIGS. 17 to 19, the EBG structure has a structure that does not include via conductors, instead of the mushroom-type conductor of FIG. 1. The EBG structure comprises: a plurality of patch conductors 11 that are formed on the first surface of the dielectric substrate 1 and are electromagnetically coupled with the ground conductor 6; and a plurality of stub conductors 12 that are formed on the first surface of the dielectric substrate 1 so as to be connected to each patch conductor 11 and are electromagnetically coupled with the ground conductor 6.

In the example of FIG. 17, each patch conductor 11 has a square shape. However, each patch conductor 11 is not restricted to a square and may have any shape such as a triangle, a hexagon, a rectangle, or the like.

Mutually adjacent patch conductors 11 may be electrically connected to each other via the stub conductors 12.

The electromagnetic coupling adjustment section comprises at least one slit (or an opening) 13 that is formed in the ground conductor 6 so as to oppose at least a part of the plurality of stub conductors 12. Each patch conductor 11 is capacitively coupled with the ground conductor 6, and each stub conductor 12 has a prescribed inductance. Consequently, each slit 13 is formed in the ground conductor 6 such that the magnitude of the capacitance between each patch conductor 11 and the ground conductor 6 is not caused to decrease, and consequently so as to not overlap with each patch conductor 11.

According to the antenna device of FIGS. 17 to 19, by providing the slits 13 in the EBG structure, the electromagnetic coupling between each patch conductor 11 and the ground conductor 6 is made to change for the antiresonance frequency of the EBG structure to be able to be shifted to the low-frequency side, and the isolation between the antenna elements 2 and 3 is able to be increased at this frequency.

Figure 20:
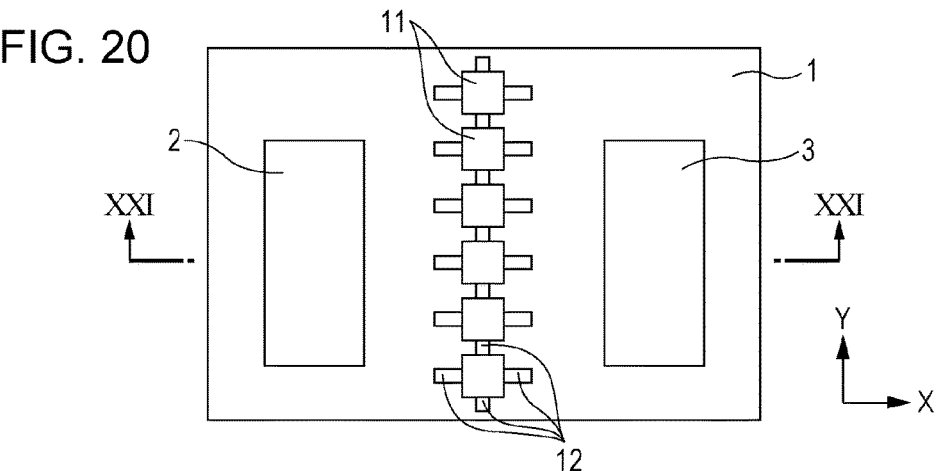
FIG. 20 is a top view illustrating the configuration of an antenna device according to a first modified example of the second embodiment.
Figure 21:
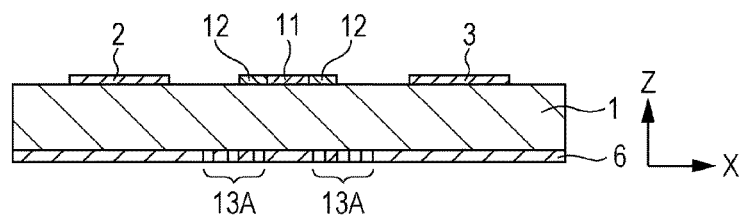
FIG. 21 is a cross-sectional view illustrating the configuration of the antenna device at line XXI-XXI of FIG. 20.
Figure 22:
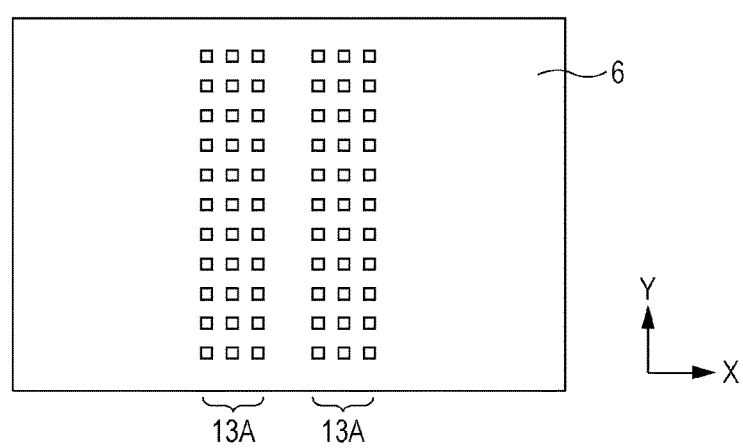
FIG. 22 is a top view illustrating the pattern of a ground conductor of FIG. 21.

FIG. 20 is a top view illustrating the configuration of an antenna device according to a first modified example of the second embodiment. FIG. 21 is a cross-sectional view illustrating the configuration of the antenna device at line XXI-XXI of FIG. 20. FIG. 22 is a top view illustrating the pattern of the ground conductor 6 of FIG. 21.

An antenna device having a structure that does not include via conductors may be provided with a mesh 13A (i.e. an electromagnetic coupling adjustment section formed with the ground conductor 6 being removed in a mesh shape) instead of the slits 13 of the antenna device of FIGS. 17 to 19. The mesh 13A comprises a plurality of mesh-shaped openings. At least one of the openings opposes at least part of the plurality of stub conductors 12.

According to the antenna device of FIGS. 20 to 22, by providing the mesh 13A in the EBG structure, the electromagnetic coupling between each patch conductor 11 and the ground conductor 6 is made to change for the antiresonance frequency of the EBG structure to be able to be shifted to the low-frequency side, and the isolation between the antenna elements 2 and 3 is able to be increased at this frequency.

Figure 23:
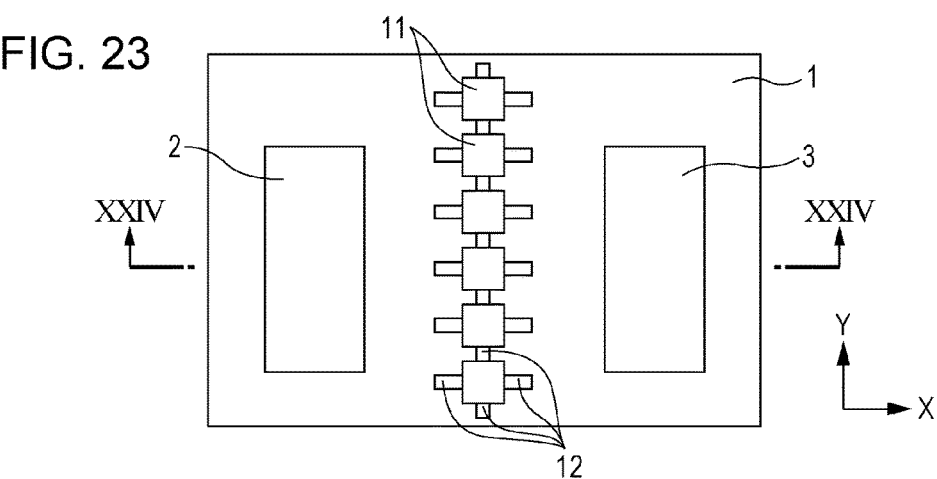
FIG. 23 is a top view illustrating the configuration of an antenna device according to a second modified example of the second embodiment.
Figure 24:
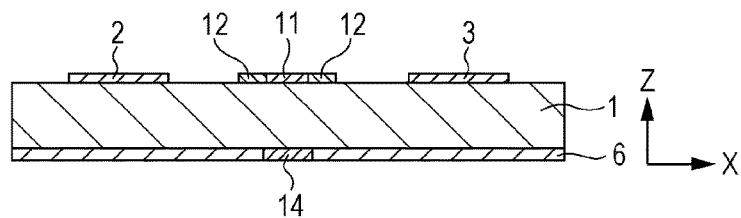
FIG. 24 is a cross-sectional view illustrating the configuration of the antenna device at line XXIV-XXIV of FIG. 23.
Figure 25:
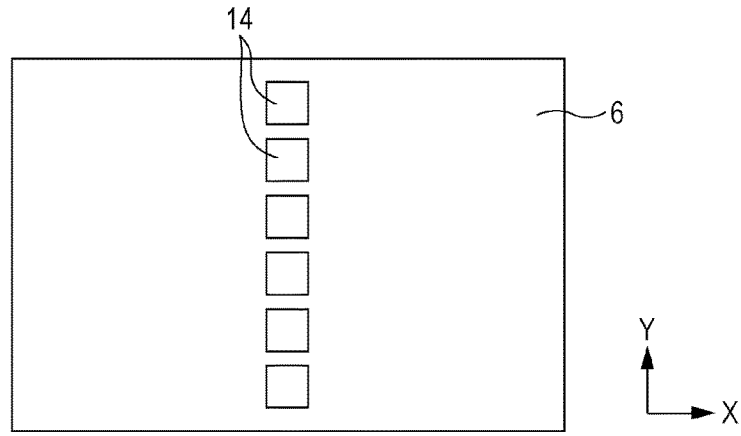
FIG. 25 is a top view illustrating the pattern of a ground conductor of FIG. 24.

FIG. 23 is a top view illustrating the configuration of an antenna device according to a second modified example of the second embodiment. FIG. 24 is a cross-sectional view illustrating the configuration of the antenna device at line XXIV-XXIV of FIG. 23. FIG. 25 is a top view illustrating the pattern of the ground conductor 6 of FIG. 24.

The electromagnetic coupling adjustment section comprises slits (or openings) 14 that are formed in the ground conductor 6 so as to oppose at least part of the plurality of patch conductors 11, instead of the slits 13 of the antenna device of FIGS. 17 to 19.

According to the antenna device of FIGS. 23 to 25, by providing the slits 14 in the EBG structure, the electromagnetic coupling between each patch conductor 11 and the ground conductor 6 is made to change for the antiresonance frequency of the EBG structure to be able to be shifted to the high-frequency side, and the isolation between the antenna elements 2 and 3 is able to be increased at this frequency.

Figure 26:
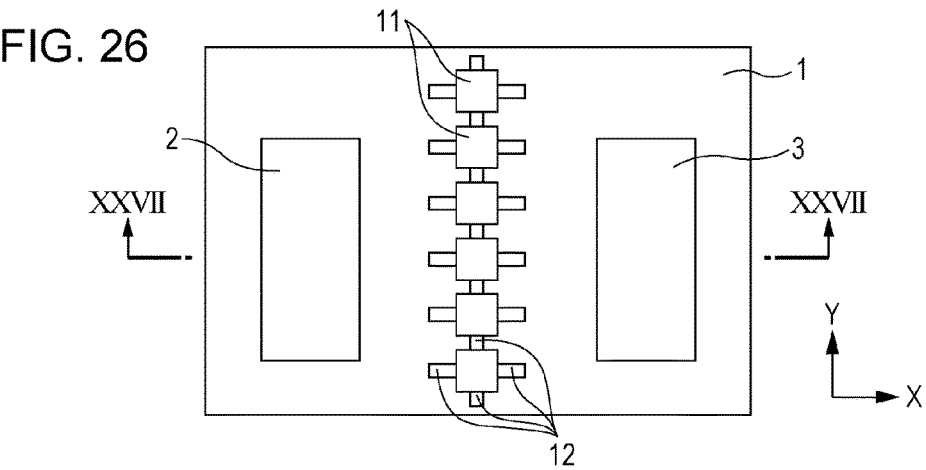
FIG. 26 is a top view illustrating the configuration of an antenna device according to a third modified example of the second embodiment.
Figure 27:
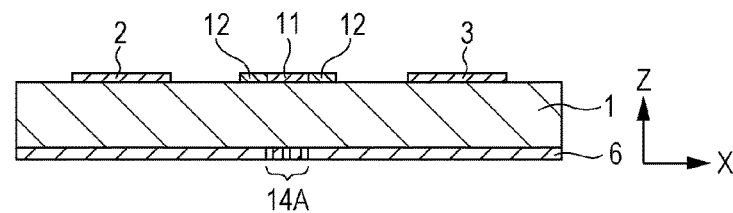
FIG. 27 is a cross-sectional view illustrating the configuration of the antenna device at line XXVII-XXVII of FIG. 26.
Figure 28:
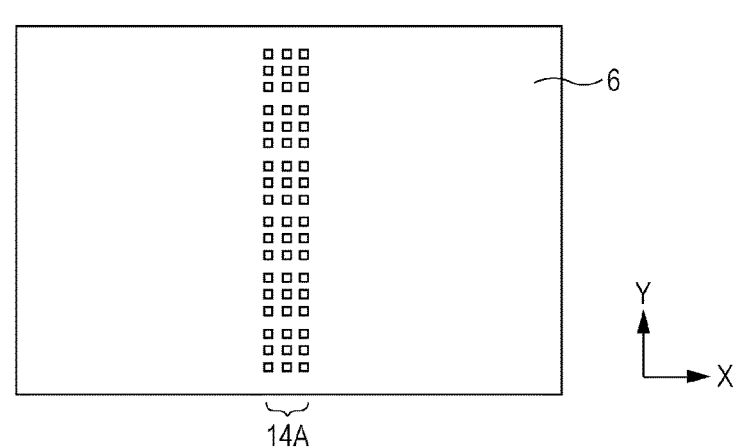
FIG. 28 is a top view illustrating the pattern of a ground conductor of FIG. 27.

FIG. 26 is a top view illustrating the configuration of an antenna device according to a third modified example of the second embodiment. FIG. 27 is a cross-sectional view illustrating the configuration of the antenna device at line XXVII-XXVII of FIG. 26. FIG. 28 is a top view illustrating the pattern of the ground conductor 6 of FIG. 27.

An antenna device having a structure that does not include via conductors may be provided with a mesh 14A (i.e. an electromagnetic coupling adjustment section formed with the ground conductor 6 being removed in a mesh shape) instead of the slits 14 of the antenna device of FIGS. 23 to 25. The mesh 14A comprises a plurality of mesh-shaped openings. At least one of the openings opposes at least part of the plurality of patch conductors 11.

According to the antenna device of FIGS. 26 to 28, by providing the mesh 14A in the EBG structure, the electromagnetic coupling between each patch conductor 11 and the ground conductor 6 is made to change for the antiresonance frequency of the EBG structure to be able to be shifted to the high-frequency side, and the isolation between the antenna elements 2 and 3 is able to be increased at this frequency.

Third Embodiment

Figure 29:
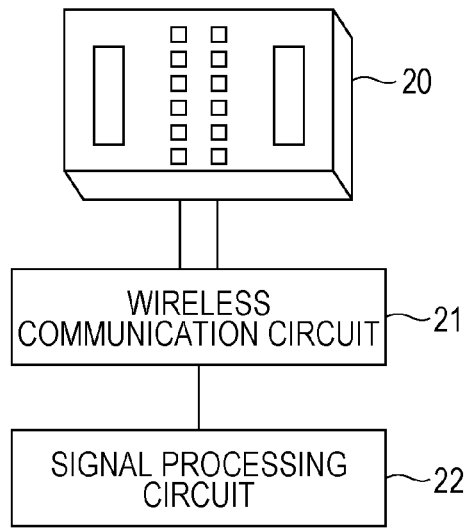
FIG. 29 is a block diagram illustrating the configuration of a wireless communication device according to a third embodiment.

FIG. 29 is a block diagram illustrating the configuration of a wireless communication device according to the third embodiment. The wireless communication device of FIG. 29 comprises an antenna device 20 as per any of the descriptions given with reference to FIGS. 1 to 28, a wireless communication circuit 21, and a signal processing circuit 22. The antenna device 20 may use one of the two antenna elements 2 and 3 as a transmission antenna element and may use the other as a reception antenna element. The wireless communication circuit 21 radiates a wireless signal obtained by modulating a baseband signal sent from the signal processing circuit 22, from the antenna device 20, and sends a baseband signal obtained by demodulating a wireless signal received by the antenna device 20, to the signal processing circuit 22.

Fourth Embodiment

Figure 30:
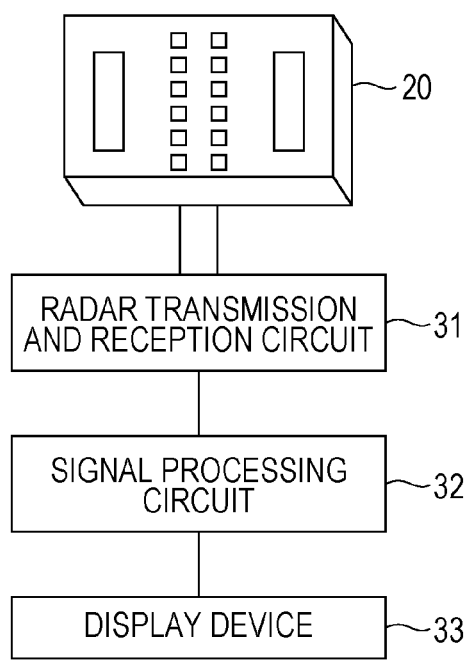
FIG. 30 is a block diagram illustrating the configuration of a radar device according to a fourth embodiment.

FIG. 30 is a block diagram illustrating the configuration of a radar device according to a fourth embodiment. The radar device of FIG. 30 comprises the antenna device 20 as per any of the descriptions given with reference to FIGS. 1 to 28, a radar transmission and reception circuit 31, a signal processing circuit 32, and a display device 33. As in the wireless communication device of FIG. 29, in the radar device of FIG. 30 also, the antenna device 20 may use one of the two antenna elements 2 and 3 as a transmission antenna element and may use the other as a reception antenna element. The radar transmission and reception circuit 31 radiates radar waves from the antenna device 20 under the control of the signal processing circuit 32, and receives radar waves reflected by a target and input to the antenna device 20. The signal processing circuit 32 determines the distance from the antenna device 20 to the target, speed, and the like on the basis of the propagation time, frequency changes, and the like of the radar waves, and displays that result on the display device 33.

According to the antenna device of each embodiment, there are few process limitations, excessive components for adjusting frequency are not required, there is no increase in the size of the antenna device, and it is possible to adjust the antiresonance frequency of the EBG structure.

According to the antenna device of each embodiment, it is possible to ensure high isolation between the antenna elements 2 and 3 in the desired frequency band even without an increase in the number of substrate stages that make up the EBG structure.

The necessity of ensuring high isolation between antenna elements increases in the EHF band. According to the antenna device of each embodiment, it is possible to ensure high isolation between the antenna elements 2 and 3 in the desired frequency band.

An antenna device of an embodiment of the present disclosure comprises: a dielectric substrate that has first and second surfaces; first and second antenna elements that are arranged on the first surface of the dielectric substrate; a ground conductor that is arranged on the second surface of the dielectric substrate; and an electromagnetic band gap structure that is arranged between the first and second antenna elements on the dielectric substrate. The electromagnetic band gap structure comprises: a plurality of patch conductors that are arranged on the first surface of the dielectric substrate and are electromagnetically coupled with the ground conductor; and at least one opening that is arranged in the ground conductor to expose the dielectric substrate, and causes the electromagnetic coupling between the plurality of patch conductors and the ground conductor to change.

The plurality of patch conductors may be arranged in a plurality of columns that extend to intersect a hypothetical line that joins the first and second antenna elements. The electromagnetic band gap structure may further comprise a plurality of via conductors that each pass through the dielectric substrate and connect the plurality of patch conductors to the ground conductor.

The at least one opening may comprise, in at least one column from among the plurality of columns of the patch conductors, at least one slit that opposes a portion between each of at least one pair of the patch conductors that are mutually adjacent in the column.

The at least one opening may comprise at least one slit that opposes a portion between at least one pair of the patch conductors that are mutually adjacent between each of at least one pair of columns that are mutually adjacent from among the plurality of columns of the patch conductors.

The at least one opening may comprise: at least one slit that opposes a portion between each of at least one pair of the patch conductors that are mutually adjacent in at least one column from among the plurality of columns of the patch conductors; and at least one slit that opposes a portion between each of at least one pair of columns that are mutually adjacent from among the plurality of columns of the patch conductors.

The electromagnetic band gap structure may comprise a plurality of stub conductors that are arranged on the first surface of the dielectric substrate, and the plurality of stub conductors are connected to the plurality patch conductors and are electromagnetically coupled with the ground conductor.

The at least one opening may comprise a plurality of openings that each oppose corresponding one of the plurality of stub conductors.

The at least one opening may comprise a plurality of openings that each oppose corresponding one of the plurality of patch conductors.

The at least one opening may comprise a plurality of openings that oppose at least part of the plurality of stub conductors to form a mesh-shape.

The at least one opening comprises a plurality of openings that oppose at least part of the plurality of patch conductors to form a mesh-shaped openings.

A wireless communication device of an embodiment of the present disclosure comprises: any one of the aforementioned antenna device; and a wireless communication circuit that uses the antenna device to transmit and receive wireless signals.

A radar device of an embodiment of the present disclosure comprises: any one of the aforementioned antenna device; and a radar transmission and reception circuit that uses the antenna device to transmit and receive radar waves.

What is claimed is:

1. An antenna device comprising:
   a dielectric substrate that has first and second surfaces;
   first and second antenna elements that are arranged on the first surface of the dielectric substrate;
   a ground conductor that is arranged on the second surface of the dielectric substrate; and
   an electromagnetic band gap structure that is arranged between the first and second antenna elements on the dielectric substrate,
   the electromagnetic band gap structure comprising:
   a plurality of patch conductors that are arranged on the first surface of the dielectric substrate and are electromagnetically coupled with the ground conductor; and
   at least one opening that is arranged in the ground conductor to expose the dielectric substrate, and causes the electromagnetic coupling between the plurality of patch conductors and the ground conductor to change.

2. The antenna device according to claim 1, wherein
   the plurality of patch conductors are arranged in a plurality of columns that extend to intersect a hypothetical line that joins the first and second antenna elements, and
   the electromagnetic band gap structure further comprises a plurality of via conductors that each pass through the dielectric substrate and connect the plurality of patch conductors to the ground conductor.

3. The antenna device according to claim 2, wherein
   the at least one opening comprises, in at least one column from among the plurality of columns of the patch conductors, at least one slit that opposes a portion between each of at least one pair of the patch conductors that are mutually adjacent in the column.

4. The antenna device according to claim 2, wherein
   the at least one opening comprises at least one slit that opposes a portion between at least one pair of the patch conductors that are mutually adjacent between each of at least one pair of columns that are mutually adjacent from among the plurality of columns of the patch conductors.

5. The antenna device according to claim 2, wherein
   the at least one opening comprises:
   at least one slit that opposes a portion between each of at least one pair of the patch conductors that are mutually adjacent in at least one column from among the plurality of columns of the patch conductors; and
   at least one slit that opposes a portion between each of at least one pair of columns that are mutually adjacent from among the plurality of columns of the patch conductors.

6. The antenna device according to claim 1, wherein
   the electromagnetic band gap structure comprises a plurality of stub conductors that are arranged on the first surface of the dielectric substrate, and
   the plurality of stub conductors are connected to the plurality patch conductors and are electromagnetically coupled with the ground conductor.

7. The antenna device according to claim 6, wherein
   the at least one opening comprises a plurality of openings that each oppose corresponding one of the plurality of stub conductors.

8. The antenna device according to claim 6, wherein
   the at least one opening comprises a plurality of openings that each oppose corresponding one of the plurality of patch conductors.

9. The antenna device according to claim 6, wherein
   the at least one opening comprises a plurality of openings that oppose at least part of the plurality of stub conductors to form a mesh-shape.

10. The antenna device according to claim 6, wherein
    the at least one opening comprises a plurality of openings that oppose at least part of the plurality of patch conductors to form a mesh-shaped openings.

11. A wireless communication device comprising:
    an antenna device; and
    a wireless communication circuit that uses the antenna device to transmit and receive wireless signals,
    the antenna device comprising:
    a dielectric substrate that has first and second surfaces;
    first and second antenna elements that are arranged on the first surface of the dielectric substrate;
    a ground conductor that is arranged on the second surface of the dielectric substrate; and
    an electromagnetic band gap structure that is arranged between the first and second antenna elements on the dielectric substrate, and
    the electromagnetic band gap structure comprising:
    a plurality of patch conductors that are arranged on the first surface of the dielectric substrate and are electromagnetically coupled with the ground conductor; and
    at least one opening that is arranged in the ground conductor to expose the dielectric substrate, and causes the electromagnetic coupling between the plurality of patch conductors and the ground conductor to change.

12. A radar device comprising:
an antenna device; and
a radar transmission and reception circuit that uses the antenna device to transmit and receive radar waves,
the antenna device comprising:
a dielectric substrate that has first and second surfaces;
first and second antenna elements that are arranged on the first surface of the dielectric substrate;
a ground conductor that is arranged on the second surface of the dielectric substrate; and
an electromagnetic band gap structure that is arranged between the first and second antenna elements on the dielectric substrate, and
the electromagnetic band gap structure comprising:
a plurality of patch conductors that are arranged on the first surface of the dielectric substrate and are electromagnetically coupled with the ground conductor; and
at least one opening that is arranged in the ground conductor to expose the dielectric substrate, and causes the electromagnetic coupling between the plurality of patch conductors and the ground conductor to change.

* * * * *